Jan. 26, 1971 G. H. FATHAUER 3,559,052
PUSHBUTTON MOISTURE METER FOR DETERMINING
MOISTURE CONTENT IN GRAIN
Filed July 17, 1968 3 Sheets-Sheet 1

INVENTOR.
George H. Fathauer
BY Hill, Sherman, Meroni, Gross & Simpson ATTORNEYS

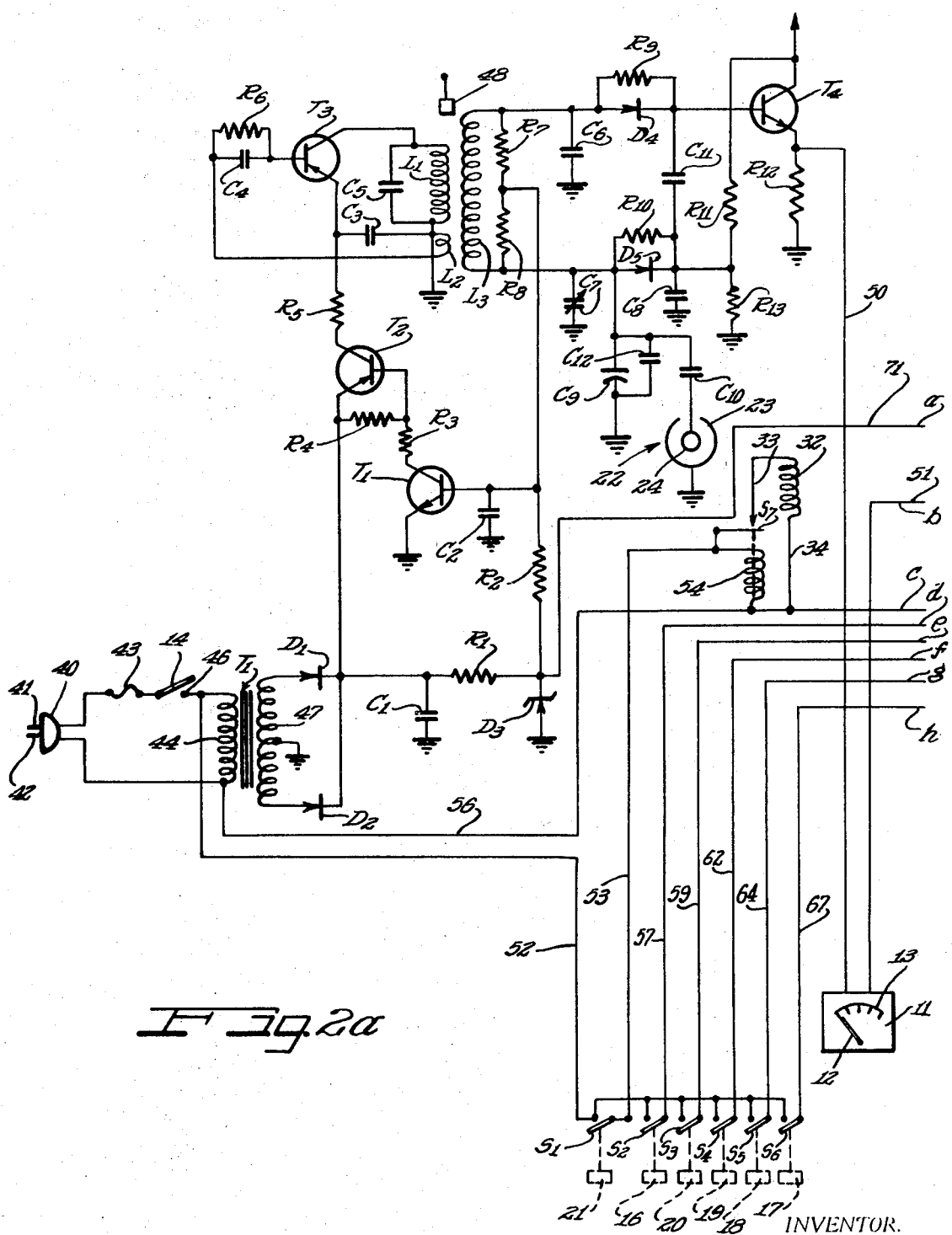

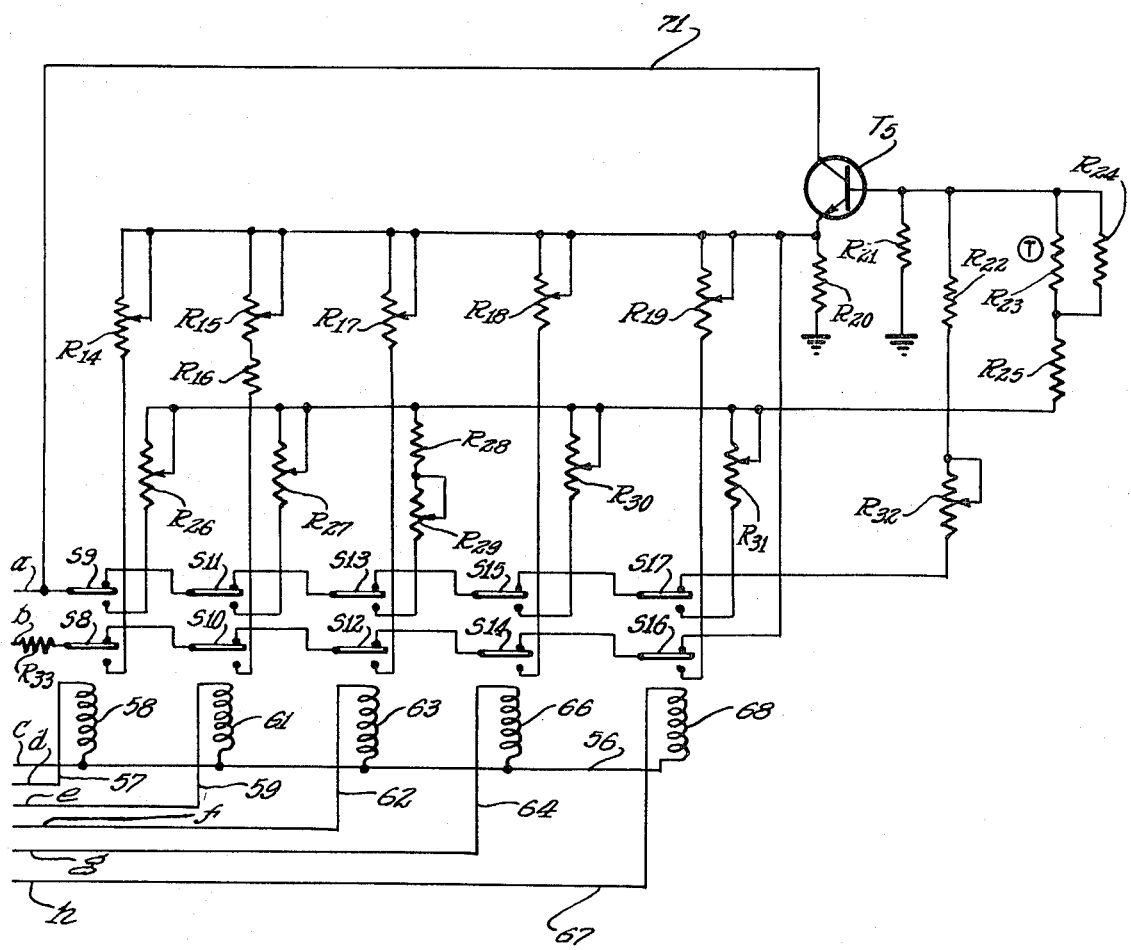

United States Patent Office 3,559,052
Patented Jan. 26, 1971

1

3,559,052
PUSHBUTTON MOISTURE METER FOR DETERMINING MOISTURE CONTENT IN GRAIN
George H. Fathauer, Decatur, Ill., assignor to Eaton Yale & Towne Inc., a corporation of Ohio
Filed July 17, 1968, Ser. No. 745,514
Int. Cl. G01n 27/26
U.S. Cl. 324—61                                      5 Claims

ABSTRACT OF THE DISCLOSURE

An automatic moisture meter for calculating and indicating the moisture content of various commodities. Selector switches allow the device to be changed from one to a number of commodities. The readout meter for indicating moisture is automatically calibrated to read percent of moisture for each commodity. The invention includes a capacitive type moisture sensing circuit for measuring the moisture content of grain but provides for the insertion of a series impedance with a moisture indicating meter for a particular grain which corresponds to the slope of the moisture characteristic curve of that particular grain and provides for the insertion of a second impedance in circuit with the meter so as to shift the response of the system to correspond to the particular grain being tested.

CROSS REFERENCES TO RELATED PATENTS

This invention is an improvement on the moisture tester shown in my Pat. No. 3,051,894 which issued on Aug. 28, 1962 entitled "Impedance Indicating Instrument."

BACKGROUND OF THE INVENTION

Field of the invention

This invention relates in general to moisture meters and in particular to an automatic moisture meter for indicating the percentage of moisture in a number of products.

Description of the prior art

Moisture meters for measuring the percentage of moisture in commodities have previously required that a sample be weighed before placing it in a moisture meter. The moisture meters of the prior art were then manually adjusted to balance a bridge at which time the reading of a meter could be made. To convert this reading into the actual percentage of moisture, the temperature of the sample would have to be measured and the meter reading converted to the actual percentage.

SUMMARY OF THE INVENTION

The present invention relates to a moisture meter which has an overflow test cylinder with a funnel which assures uniform density in the test cylinder. This eliminates the requirement for weighing which has previously existed in moisture meters. The moisture meter of this invention is provided with a plurality of switches which, in a particular embodiment, are pushbutton switches to allow a selection to be made of the particular commodity being tested. A temperature compensating resistor is mounted in the test cell to calibrate the moisture meter for temperature. After the percentage of moisture for the sample is read, the switch may be closed to dump the sample from the test cell and a second sample may be placed into the test cell for a new reading.

Other objects, features and advantages of the present invention will be readily apparent from the following detailed description of certain preferred embodiments thereof in conjunction with the accompanying drawings.

BRIEF DESCRIPTION OF THE DRAWINGS

FIGS. 2a and 2b illustrate an electrical schematic diagram of the moisture meter illustrated in FIG. 1.

DESCRIPTION OF THE PREFERRED EMBODIMENTS

Moisture meters previously used for measuring the percentage of moisture in produce have generally required that a sample to be tested be weighed, and then placed into a test cell which forms a part of an electrical bridge circuit that is manually adjusted. The setting of the bridge is noted and is converted to a percentage moisture. Corrections for the grain temperature are necessary for highest accuracy. The test cell is then picked up and emptied by pouring the sample from it before another sample may be weighed and tested. This procedure has required a substantial time to complete the test and has required a number of manual operations before the correct moisture percentage is obtained.

The present invention has a test cylinder which is fitted with a specially designed funnel that provides that the test cylinder is filled with uniform density. A temperature compensating resistor is mounted in the test cell and is connected in circuit with the moisture meter to automatically compensate for temperature variations. The moisture meter is provided with a number of switches to select the correct circuit parameters for the particular commodity being tested and is provided with a dump button for automatically dumping the sample from the test cell so that another sample may be received.

The machine of this invention results in moisture tests of produce, such as grain, being completed within a few seconds, where previously a number of minutes were required to accurately weigh, measure the temperature, and manually adjust an instrument to obtain the moisture content.

Figure 1:
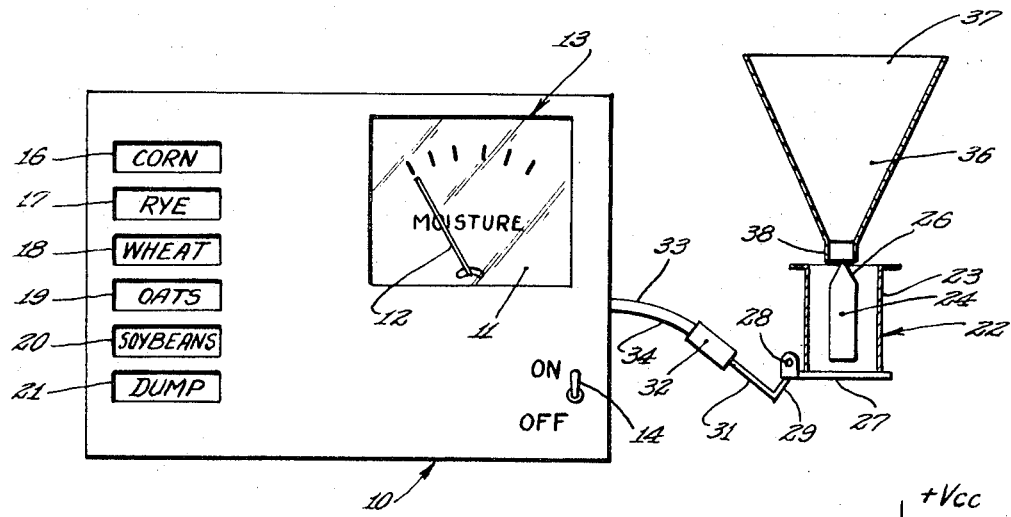
FIG. 1 illustrates the automatic moisture meter of this invention.

FIG. 1 illustrates the moisture meter of this invention and comprises a chassis 10 which has a moisture meter 11 mounted on it with an indicating needle 12 that can be read against indicia 13 to indicate the percentage of moisture in a sample. An on-off switch 14 is mounted on the moisture meter to turn the device on.

A plurality of switches are mounted in the chassis 10 for setting the machine for different produce. For example, a first button 16 is depressed to close a switch when corn is to be tested. A second pushbutton 17 controls a switch which is closed when rye is to be tested, a third pushbutton 18 is pushed when a switch is to be closed for measuring wheat, a fourth pushbutton 19 allows a switch to be closed when oats are to be tested, a fifth pushbutton 20 allows a switch to be closed when soybeans are to be tested, and a sixth pushbutton 21 closes a switch when the test cell is to be dumped.

The test cell is indicated generally by the numeral 22 and includes an outer cylinder 23 and an inner probe 24 formed with an upper pointed portion 26. A dump gate 27 is pivotally attached by a shaft 28 to a suitable supporting structure (not shown) and is formed with a lug 29 to which a link 31 is attached which is controlled by dump solenoid 32. Leads 33 and 34 extend from the solenoid 32 to the chassis 10, as shown in more detail in schematics. A load funnel 36 has an upper end 37 into which produce samples are poured and has a discharge end 38 which discharges into the test cell 22. The test cell 22, including the inner probe 24, are designed so that the produce poured into the funnel 36 will uniformly fill the test cell 22 to obtain uniform density. Any excess produce poured into the test cell will spill over the top and fall into a bin (not shown) into which the produce is dumped. The construction of the funnel 36 and test cell 22 eliminates the requirement for weighing samples to be placed into the moisture meter. The dump door 27 allows rapid and automatic release of the produce after the moisture content has been obtained so that rapid testing can occur.

FIGS. 2a and 2b comprise a schematic diagram of the electrical circuitry of this invention. A power plug 40 has a pair of contacts 41 and 42 that are insertable into a conventional AC power outlet. Plug 41 is connected to a fuse 43 which has its opposite side connected to the on-off switch 14. The primary 44 of a transistor $T_1$ is connected to prong 42 and contact 46 of switch 14.

The secondary 47 of transistor $T_1$ has its midpoint connected to ground and its opposite ends connected to diodes $D_1$ and $D_2$ respectively, to rectify the AC signal. A capacitor $C_1$ is connected from the diodes $D_1$ and $D_2$ to ground. A resistor $R_1$ is connected from the diodes $D_1$ and $D_2$ to a diode $D_3$. A resistor $R_2$ is connected to the diode $D_3$ and to a capacitor $C_2$ which has its opposite side grounded. The transistor $T_1$ has its base connected to the capacitor $C_2$ and resistor $R_2$. The emitter of transistor $T_1$ is connected to ground and the collector is connected to a resistor $R_3$ which has its opposite side connected to the base of a transistor $T_2$. The emitter of the transistor $T_2$ is connected to the diodes $D_1$ and $D_2$ and to a resistor $R_4$ which has its opposite side connected to the base of the transistor $T_2$. A resistor $R_5$ is connected to the collector of the transistor $T_2$ and to the emitter of a transistor $T_3$. The transistor $T_3$ is the amplifier for an oscillator and has a resonant circuit comprising the capacitor $C_5$ and inductance $L_1$ which are connected from the collector to ground. The condenser $C_3$ is connected from ground to the emitter of transistor $T_3$ and a feedback coil $L_2$ is connected from ground to a capacitor $C_4$ and resistor $R_6$ which are connected in parallel and with their other sides connected to the base of the transistor $T_3$. A tuning slug 48 is moveable relative to the inductors $L_1$ and $L_2$ and an output inductor $L_3$ to tune the oscillator.

A pair of resistors $R_7$ and $R_8$ are connected across the inductor $L_3$ and their midpoint is connected to the base of the transistor $T_1$. A capacitor $C_6$ is connected from one end of the inductor $L_3$ to ground and a variable capacitor $C_7$ is connected from the other end of the inductance $L_3$ to ground. A diode $D_4$ is connected from one end of the inductor $L_3$ to the base of a transistor $T_4$, and a resistor $R_9$ is connected in parallel with the diode $D_4$. A diode $D_5$ is connected from the other end of the inductor $L_3$ to a capacitor $C_8$ and a resistor $R_{13}$ which have their other ends connected to ground. A resistor $R_{10}$ is connected in parallel with the diode $D_5$. A capacitor $C_{11}$ is connected between the diodes $D_4$ and $D_5$. A capacitor $C_{12}$ is connected in parallel with the capacitor $C_9$ and a capacitor $C_{10}$ is connected from the capacitors $C_9$ and $C_{12}$ to the probe 24 of the test cell 22. The outer wall 23 of the test cell 22 is connected to ground.

A resistor $R_{11}$ is connected from the diode $D_5$ to the collector of transistor $T_4$. A resistor $R_{12}$ is connected from the emitter of the transistor $T_4$ to ground. A lead 50 is connected from the emitter of transistor $T_4$ to the meter 11. A lead 51 is connected from the meter 11 to a resistor $R_{33}$. A lead 52 is connected to contact 46 and to a common terminal of switches $S_1$ through $S_6$ which are controlled by the pushbuttons 21, 16, 20, 19, 18 and 17, respectively. Switch $S_1$, for example, is connected to lead 53 which is connected to a relay coil 54 which closes a switch $S_7$ to energize the dump solenoid 32. The other side of the dump solenoid is connected by lead 34 to power lead 56. Switch $S_2$ is connected by lead 57 to a corn solenoid 58 which controls switches $S_8$ and $S_9$. Switch $S_3$ is connected by lead 59 to soybean solenoid 61 which controls switch contacts $S_{10}$ and $S_{11}$. Switch $S_4$ is connected by lead 62 to oats solenoid 63 which controls the switch contacts of switches $S_{12}$ and $S_{13}$. Lead 64 is connected to switch $S_5$ which controls wheat solenoid 66 that controls switch contacts $S_{15}$ and $S_{14}$. A lead 67 is connected to switch $S_6$ and to a rye solenoid 68 which controls switch contacts $S_{16}$ and $S_{17}$. Transistor $T_5$ has its collector connected to lead 71 and has its emitter connected to one end of a resistor $R_{20}$ which has its opposite side connected to ground. An adjustable resistor $R_{14}$ is connected between the emitter of transistor $T_5$ and the contact of switch $S_8$. The emitter of transistor $T_5$ is connected to an adjustable resistor $R_{15}$ which has its opposite side connected to a resistor $R_{16}$ which has its opposite side connected to a contact of switch $S_{10}$. Adjustable resistors $R_{17}$, $R_{18}$ and $R_{19}$ are connected to the emitter of transistor $T_5$ and have their opposite sides connected, respectively, to switches $S_{12}$, $S_{14}$ and $S_{16}$. A resistor $R_{21}$ is connected between the base of transistor $T_5$ and ground. A temperature compensating thermistor $R_{23}$ is connected in parallel with resistor $R_{24}$ and one end of the combination is connected to the base of transistor $T_5$ and the other end is connected to a resistor $R_{25}$. The other end of resistor $R_{25}$ is connected to an adjustable resistor $R_{26}$ which has its opposite end connected to the contact of switch $S_9$. A resistor $R_{27}$ is connected between the switch contact of switch $S_{11}$ and resistor $R_{25}$. An adjustable resistor $R_{29}$ is connected in series with the resistor $R_{28}$ and the combination connected between the contact of switch $S_{13}$ and resistor $R_{25}$. Adjustable resistors $R_{30}$ and $R_{31}$ are connected between the resistor $R_{25}$ and switch contacts of switches $S_{15}$ and $S_{17}$. An adjustable resistor $R_{32}$ is connected from resistor $R_{22}$ to a contact of switch $S_{17}$.

The thermistor $R_{23}$ is mounted in the test cell 23 so as to compensate the circuit for the temperature of the produce in the test cell which is being tested. It is to be realized that circuits utilizing oscillators which produce indications based on the capacitance of a test sample of grain are well known to those skilled in the art. For example, patent such as 3,051,894, cross-referenced herein, and Pat. No. 3,231,814 disclose systems wherein electrical oscillators are connected in circuit with a variable capacitor which includes grain of unknown moisture content in a test cell and in which the moisture content of the grain produces a large capacitance and a less moist grain produces a smaller capacitance. However, the slope and response of prior systems such as disclosed in Pats. 3,051,894 and 3,231,814 have required manual adjustment of cards or knobs, to determine the moisture content of a particular grain. For example, in Pat. 3,051,894, the dial 19 is calibrated for different grains depending upon their characteristics. In prior systems such as Pat. No. 3,051,894, oscillatory signals are applied to the grain cell as for example the grain cell 43 in Pat. No. 3,051,894 and the grain cell 46 in Pat. No. 3,231,814. In the present invention, an oscillatory signal is applied to the grain cell 22 from the circuit including the transistor $T_3$ which is connected in an oscillatory circuit with the primary $L_1$ and feedback winding $L_2$ and capacitors $C_5$ and $C_3$. By varying the tuning slug 48 the oscillator may be tuned to a desired frequency. It is to be particularly noted that the capacitive test cell 22 is connected in circuit with the output of the oscillator through capacitor $C_{10}$ and is coupled to the base of the transistor $T_4$ through the capacitor $C_{10}$ and the diode $D_5$ in parallel with the resistor $R_{10}$ and through the capacitor $C_{11}$. Thus, the signal on the base of the transistor $T_4$ varies in accordance with the capacitance of the test cell 22 which is determined by the moisture content of the grain which directly affects the capacitance between members 23 and 24. The output of the transistor $T_4$ is detected by the meter 11 to indicate directly the moisture content of the grain in a bridge circuit including the transistors $T_4$ and $T_5$ which have the same voltage $V_{cc}$ applied to their collectors. The meter 11 is connected between the emitters of transistors $T_4$ and $T_5$.

It is also of interest to note that the balance point of meter 11 may be shifted by varying the impedance between the collector and base of transistor $T_5$ and this resistance may be varied by selectively connecting the resistors $R_{26}$ through $R_{32}$ between the base and collector of the transistor $T_5$. The slope of the response to the meter 11 may be varied by changing the impedance in series with the meter 11 and the emitter of transistor $T_5$ and this is accomplished by selectively connecting resistors $R_{14}$ through $R_{19}$ in circuit between the meter 11 and emitter of transistor $T_5$.

Thus, it is seen that the grain in the test cell 22 changes the output on the base of the transistor $T_4$ and that by changing the impedance in series with the emitter of $T_4$, the meter 11 and the emitter of transistor $T_5$, the slope of the response of the meter characteristic may be varied to correspond to the particular grain in the test cell 22. At the same time the characteristic of the curve may be shifted to the left or right by changing the impedance between the base and collector of transistor $T_5$ to correspond to the particular grain under test. Thus, the pushbuttons and switches $S_{10}$ through $S_{17}$ change these two impedances to correspond to the particular grain being tested by the capacitive test cell 22.

Figure 3:
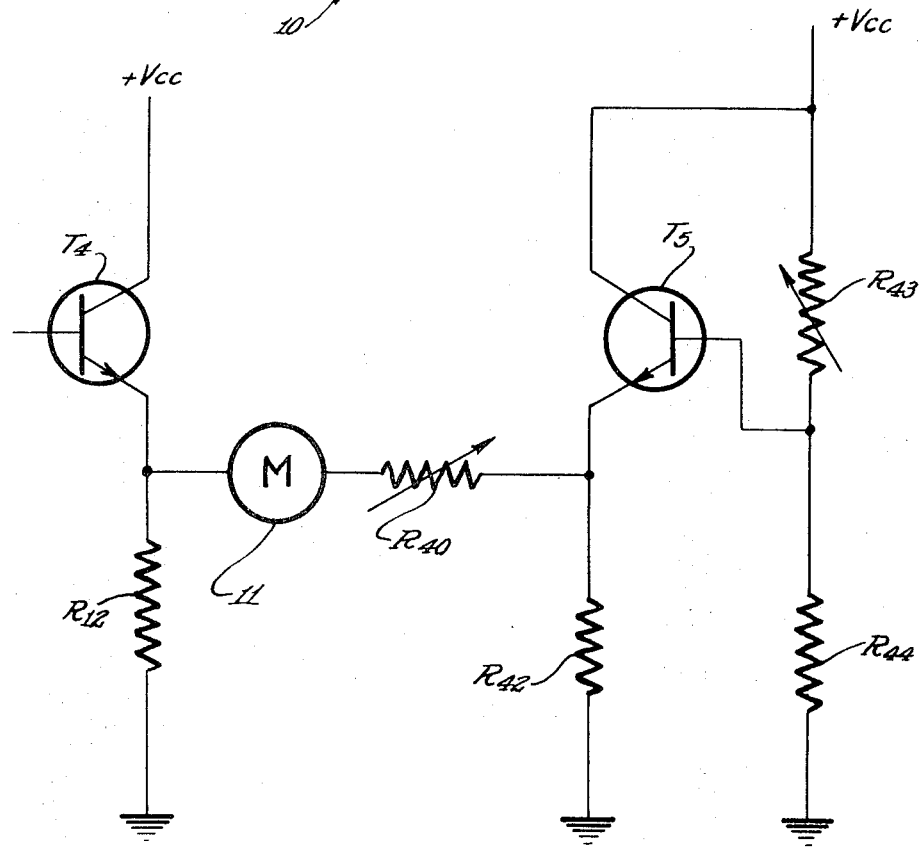
FIG. 3 is a simplified schematic of the readout meter circuitry.

FIG. 3 is a simplified version of the electrical schematic illustrated in FIG. 2 for the meter control circuit. It is noted that the meter 11 is connected in circuit between the transistors $T_4$ and $T_5$ and that there is an adjustable resistor $R_{40}$ in series with the meter 11. A resistor $R_{42}$ is the equivalent resistance of the impedance in circuit of the schematic of FIG. 2, and an adjustable resistor $R_{43}$ represents the resistance which is changed when different produce is being tested, in accordance with the pushing of the push button switches $S_{16}$ through $S_{20}$. The series impedance $R_{40}$ determines the slope of the moisture characteristic curve and thus, by varying this impedance, the response of the meter and circuit will be adjusted to coincide with the particular slope of the produce being tested.

The variable impedance $R_{43}$ between the base and collector of transistor $T_5$ shifts the response of the system to the left or right as the impedance is varied.

Different produce have different response characteristics as a function of moisture and by adjusting the impedances $R_{40}$ and $R_{43}$ the moisture tester will correspond to the characteristic of a particular produce.

Thus, for example, if corn is being tested the pushbutton 16 would be depressed to close switch $S_2$ which would energize the corn relay 58 to connect the resistor $R_{14}$ in circuit with transistor $T_5$. Thus, resistor $R_{14}$ is in series with the meter 11 and leads 50 and 51 and corresponds to the impedance $R_{40}$ in FIG. 3. The relay 58 also connects impedance $R_{26}$ between the base of transistor $T_5$ and the collector of the transistor $T_5$, and thus, $R_{26}$ establishes the impedance with resistors $R_{24}$, $R_{25}$ and the thermistor $R_{23}$ between the base and collector of the transistor $T_5$. This corresponds to the impedance $R_{43}$ illustrated in FIG. 3. Thus, the pushbuttons 16 through 20 provide means for adjusting the impedances $R_{40}$ and $R_{43}$ in the schematic view of FIG. 3, and the meter 11 will correspond to the moisture characteristics of the particular pushbutton depressed.

The farmer tries to market corn when it has a moisture content of 14% because corn is purchased by weight. However, if the moisture content is 17% or higher, it must be dried before it is stored to prevent spoilage. The present invention allows a grain operator to rapidly test produce as it is brought in for purchase and as each sample is tested the dump button 21 is depressed to actuate the dump gate 27 to empty the test cell 22. After the button 21 is depressed, it is released and has a spring return that deenergizes the dump solenoid so that the dump door 27 will return to the closed position.

In a particular embodiment constructed according to this invention the components have the following values:

$R_1$—330 ohms
$R_2$—8.25K
$R_3$—3.9K
$R_4$—3.9K
$R_5$—100 ohms
$R_6$—33K
$R_7$—11.8K
$R_8$—11.8K
$R_9$—47K
$R_{10}$—47K
$R_{11}$—11.5K
$R_{12}$—2.2K
$R_{13}$—1.62K
$R_{14}$—5K
$R_{15}$—5K
$R_{16}$—1.5K
$R_{17}$—5K
$R_{18}$—5K
$R_{19}$—5K
$R_{20}$—2.2K
$R_{21}$—1690 ohms
$R_{22}$—6980 ohms
$R_{23}$—1K
$R_{24}$—1300 ohms
$R_{25}$—2550 ohms
$R_{26}$—1K
$R_{27}$—1K
$R_{28}$—750 ohms
$R_{29}$—1K
$R_{30}$—1K
$R_{31}$—1K
$R_{32}$—1K
$R_{33}$—2K
$C_1$—500 microfarads
$C_2$—1.22 microfarads
$C_3$—0.01 microfarad
$C_4$—470 picofarads
$C_5$—680 picofarads
$C_6$—75 picofarads
$C_8$—.01 microfarad
$C_{10}$—62 picofarads
$C_{11}$—.01 micofarad
$C_{12}$—10 picofarads Although minor modifications might be suggested by those versed in the art, it should be understood that I wish to embody within the scope of the patent warranted hereon all such modifications as reasonably and properly come within the scope of my contribution to the art.

I claim as my invention:

1. A moisture meter for automatically determining the moisture content of various substances comprising, a test cell into which said substances are placed, electrical driving means connected to said test cell to energize it so that the capacitance of the test cell when containing said substances can be determined, a measuring circuit including the test cell, indicating means including a bridge circuit with a first leg to which said measuring circuit is coupled and having a second leg, an indicator for indicating the moisture content of said substances connected between the first and second legs of said bridge circuit, first impedance means in series with said indicator between the first and second legs of said bridge, first impedance control means connected to said first impedance means to set the first impedance means to an impedance which produces the correct slope of the moisture characteristic for the particular substance being tested in the test cell, second impedance means connected in said second leg of said bridge, and second impedance control means to set the second impedance means to an impedance which produces the correct position of the moisture characteristic for the particular substance being tested in the test cell, and means interconnecting said first and second impedance control means so that each is set for the same substance.

2. A moisture meter according to claim 1 wherein said bridge includes a first transistor with a first electrode to which said test cell is coupled and having a second electrode connected to said series circuit including said indicator, a second transistor with an electrode connected to said series circuit including said indicator, and having second and third electrodes between which said second impedance means is connected.

3. A moisture meter according to claim 2 wherein said first impedance control means comprises switching means and said first impedance means comprises a plurality of impedances that may be selectively connected in circuit by said switching means.

4. A moisture meter according to claim 3 wherein said second impedance control means comprises second switching means and said second impedance means comprises a second plurality of impedances that are selectively connected in circuit by said second switching means.

5. A moisture control according to claim 4 wherein said means interconnecting said first and second impedance control means comprises a plurality of switch selecting means coupled to said first and second switching means to actuate them.

References Cited
UNITED STATES PATENTS

| | | | |
|---|---|---|---|
| 2,611,021 | 9/1952 | Perls et al. | 324—61X |
| 2,825,870 | 3/1958 | Hart | 324—40 |
| 3,231,814 | 1/1966 | Fathauer et al. | 324—61 |

EDWARD E. KUBASIEWICZ, Primary Examiner

U.S. Cl. X.R.

324—115